United States Patent
Rupley et al.

(10) Patent No.: US 8,707,015 B2
(45) Date of Patent: Apr. 22, 2014

(54) RECLAIMING PHYSICAL REGISTERS RENAMED AS MICROCODE ARCHITECTURAL REGISTERS TO BE AVAILABLE FOR RENAMING AS INSTRUCTION SET ARCHITECTURAL REGISTERS BASED ON AN ACTIVE STATUS INDICATOR

(75) Inventors: Jeffrey P. Rupley, Round Rock, TX (US); David A. Kaplan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 628 days.

(21) Appl. No.: 12/828,402

(22) Filed: Jul. 1, 2010

(65) Prior Publication Data
US 2012/0005444 A1  Jan. 5, 2012

(51) Int. Cl.
*G06F 9/38* (2006.01)

(52) U.S. Cl.
USPC ............ 712/219; 712/216; 712/E9.045

(58) Field of Classification Search
None
See application file for complete search history.

(56) References Cited

U.S. PATENT DOCUMENTS

| | | | |
|---|---|---|---|
| 6,266,763 B1* | 7/2001 | Witt et al. | 712/36 |
| 6,425,072 B1 | 7/2002 | Meier et al. | |
| 7,043,626 B1 | 5/2006 | McMinn et al. | |
| 7,266,673 B2 | 9/2007 | Filippo et al. | |
| 7,363,469 B2* | 4/2008 | Abernathy et al. | 712/217 |
| 2005/0027968 A1 | 2/2005 | Rupley, II et al. | |
| 2008/0244224 A1 | 10/2008 | Sassone et al. | |

OTHER PUBLICATIONS

Fog, Agner, "The Microarchitecture of Intel, AMD and VIA CPU—An optimization guide for assembly programmers and compiler makers," © 1996-2009, updated Sep. 26, 2009, pp. 1-10.

* cited by examiner

*Primary Examiner* — Kenneth Kim
(74) *Attorney, Agent, or Firm* — Abel Law Group, LLP

(57) ABSTRACT

A method of operating a processor includes reclaiming a physical register renamed as a microcode architectural register used by a microcode routine. The physical register is reclaimed according to an indicator corresponding to the microcode architectural register and indicating that a pointer to the physical register and corresponding to the microcode architectural register is an active pointer.

19 Claims, 5 Drawing Sheets

US 8,707,015 B2

RECLAIMING PHYSICAL REGISTERS RENAMED AS MICROCODE ARCHITECTURAL REGISTERS TO BE AVAILABLE FOR RENAMING AS INSTRUCTION SET ARCHITECTURAL REGISTERS BASED ON AN ACTIVE STATUS INDICATOR

BACKGROUND

1. Field of the Invention

This invention is related to processing systems and more particularly to out-of-order execution processing systems.

2. Description of the Related Art

A typical out-of-order execution processor (e.g., central processing unit, microprocessor, digital signal processor, processor, processor core, or core) includes a limited number of architectural registers, which are used by instructions to store intermediate and final results prior to storing results to memory. The limited number of architectural registers can limit the number of instructions that can be in flight in the out-of-order execution processor since most instructions require at least one architectural register. However, multiple uses of a particular architectural register may represent independent variables. Register renaming techniques take advantage of that independence to allow more instructions to be in flight in a processor and reduce latencies from register dependencies.

The typical out-of-order execution processor includes more physical registers in the physical register file than architectural registers. Renaming of independent uses of a particular architectural register to different physical registers allows multiple variables to exist concurrently in the physical registers and thus, the processor can concurrently issue multiple independent instructions that utilize the same architectural register. The processor reuses physical registers when they no longer comprise part of the current state of the processor. The processor commits a state of a physical register to the architectural state (i.e., written to the architectural registers) when the processor retires the operation corresponding to the physical register.

Typical register renaming techniques assign one or more physical registers to individual architectural registers and track these register assignments. An architectural register mapping data structure (e.g., table, list or other suitable data structure) stores information (e.g., pointers) that identifies which physical registers contain the contents of a particular architectural register for an operation at a particular time. When a physical register remains renamed as an architectural register that is no longer being used, the number of instructions that are in flight may be unnecessarily reduced. Accordingly, improved techniques for mapping architectural registers to physical registers are desired.

SUMMARY OF EMBODIMENTS OF THE INVENTION

In at least one embodiment of the invention, a method of operating a processor includes reclaiming a physical register renamed as a microcode architectural register used by a microcode routine. The physical register is reclaimed according to an indicator corresponding to the microcode architectural register and indicating that a pointer to the physical register and corresponding to the microcode architectural register is an active pointer.

In at least one embodiment of the invention, an apparatus includes a physical register file and a committed rename alias data structure. The committed rename alias data structure includes a microcode architectural register mapping storage element and a corresponding indicator and is operative to store a pointer to a physical register and indicate a condition of the pointer.

In at least one embodiment of the invention, a method of operating a processor includes concurrently reclaiming a plurality of physical registers renamed as respective microcode architectural registers used by a microcode routine. The concurrent reclaiming is in response to exiting a microcode routine. In at least one embodiment of the invention, the concurrently reclaiming is based on a plurality of indicators corresponding to respective ones of the plurality of microcode architectural registers. In at least one embodiment of the invention, the plurality of indicators indicate that the plurality of microcode architectural registers correspond to active pointers to the plurality of physical registers.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
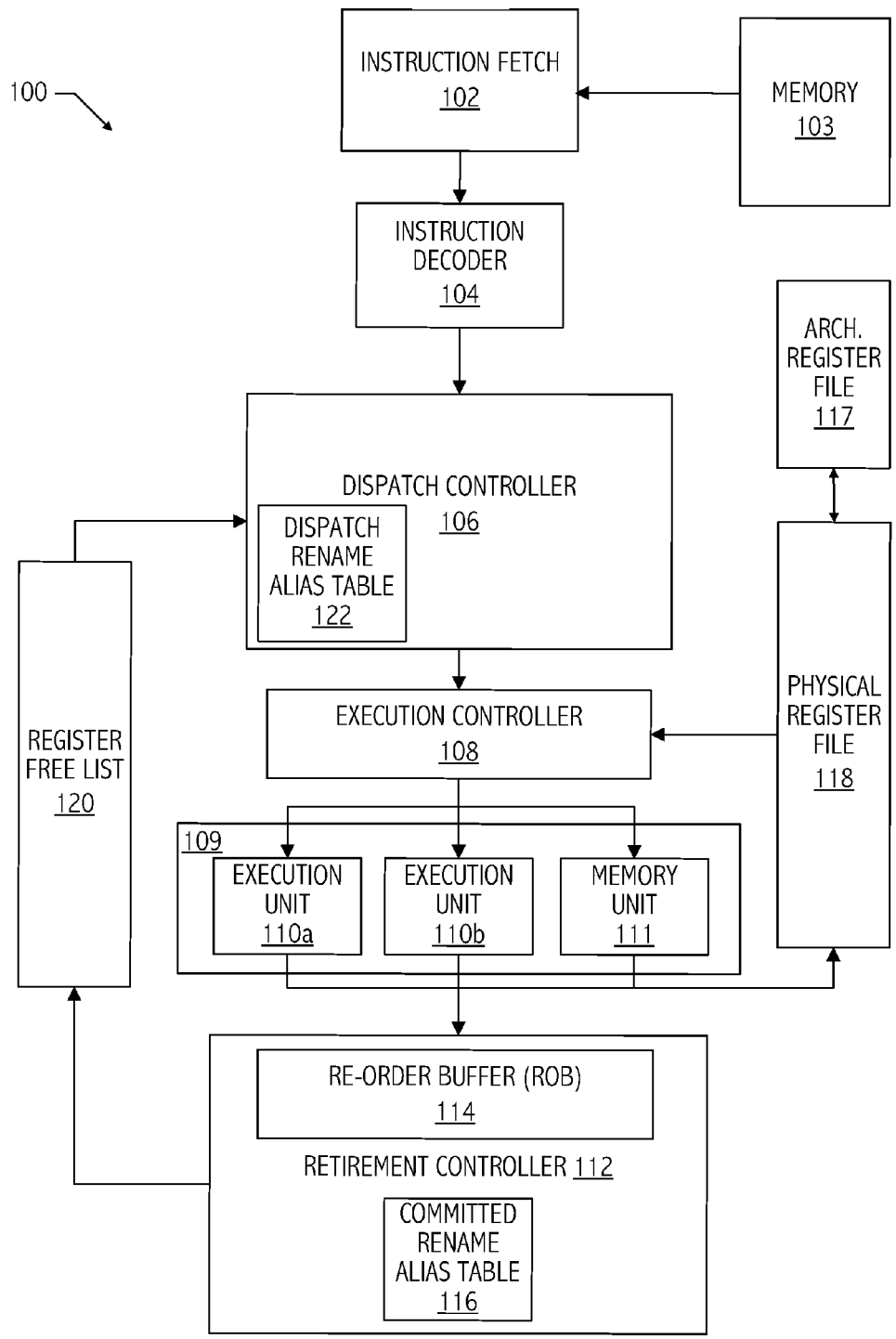
FIG. 1 illustrates a functional block diagram of portions of an exemplary out-of-order execution processing system.

Referring to FIG. 1, a typical out-of-order execution processor (e.g., processor 100) includes an instruction fetch unit (e.g., instruction fetch unit 102) that fetches instructions from a memory (e.g., memory 103, which includes one or more of cache memory and system memory) using any suitable instruction fetching technique. In at least one embodiment, instruction fetch unit 102 stores fetched instructions locally or supplies them to an instruction decode unit (e.g., instruction decoder 104). Instruction decoder 104 decodes instructions into one or more operations (i.e., complex operations or natively understood instructions) executable within execution units 109.

To facilitate out-of-order instruction execution, processor 100 includes a dispatch control unit (e.g., dispatch controller 106). Instruction decoder 104 provides operations to dispatch controller 106. In at least one embodiment of processor 100, instruction decode functions are integrated into dispatch controller 106 and a separate instruction decoder 104 is not included. In at least one embodiment, dispatch controller 106 generates signals, which may include bit-encoded operations executable by execution units 109. Dispatch controller 106 also generates operand address information, immediate data, and/or displacement data. Dispatch controller 106 includes dispatch rename map data structure (e.g., dispatch rename alias table 122), which facilitates register renaming. If an operation involves an update of an architectural register, dispatch controller 106 reserves a physical register within a physical register file (e.g., physical register file 118) for the operation and stores associated information in dispatch rename alias table 122. For example, dispatch controller 106 removes an indicator of a free physical register from a register free data structure (e.g., register free list 120). In at least one embodiment of processor 100, the architectural registers include a random access memory indexed by architectural register number. In at least one embodiment of processor 100, the architectural registers and physical register file include integer and floating point registers, but are referred to generally herein as architectural registers and physical registers unless otherwise specified.

The dispatch rename alias table 122 includes an entry corresponding to each architectural register and monitors those entries. In at least one embodiment of processor 100, dispatch controller 106 dispatches operations to an execution controller (e.g., execution controller 108). In at least one embodiment of processor 100, execution controller 108 temporarily stores operation information to be executed by the execution units in a data structure (e.g., instruction buffer or reservation station), where an operation waits until input operands for the operation are available. Execution controller 108 schedules operations for issue to execution units 109. In at least one embodiment, execution controller 108 issues operations to execution units 109 in an order different from the order of corresponding instructions in an original program instruction sequence read from memory 103. Speculative operations (i.e., operations that are executed although their results may not be needed) may remain in execution controller 108 at least until those operations become non-speculative. In at least one embodiment of processor 100, execution units 109 include one or more of a floating point arithmetic unit, integer arithmetic unit, address generation unit, memory unit 111, or other suitable execution units 110. Results from execution units 109 are provided to a retirement controller (e.g., retirement controller 112). Retirement controller 112 stores results from the execution units in a reorder data structure (e.g., reorder buffer 114).

Retirement controller 112 monitors the original program sequence for register read and write operations, allows for speculative instruction execution and branch misprediction recovery, and facilitates precise interrupts. In at least one embodiment, reorder buffer 114 retires an operation in response to that operation completing execution and any data or control speculation performed on any operations being verified, for operations up to and including that operation, in program order. Retirement controller 112 commits the state of a physical register to the architectural state of processor 100 (e.g., to architectural register file 117) when the operation that generated the value in that physical register is retired. In at least one embodiment, as retirement controller 112 retires operations, retirement controller 112 de-allocates (i.e., reclaims) registers in the physical register file that are no longer needed to store architectural register states by providing an indication of the free state of the physical register to register free list 120. In at least one embodiment, register free list 120 stores pointers (e.g., physical register file indices) to available (i.e., unused or free) physical registers.

Figure 2:
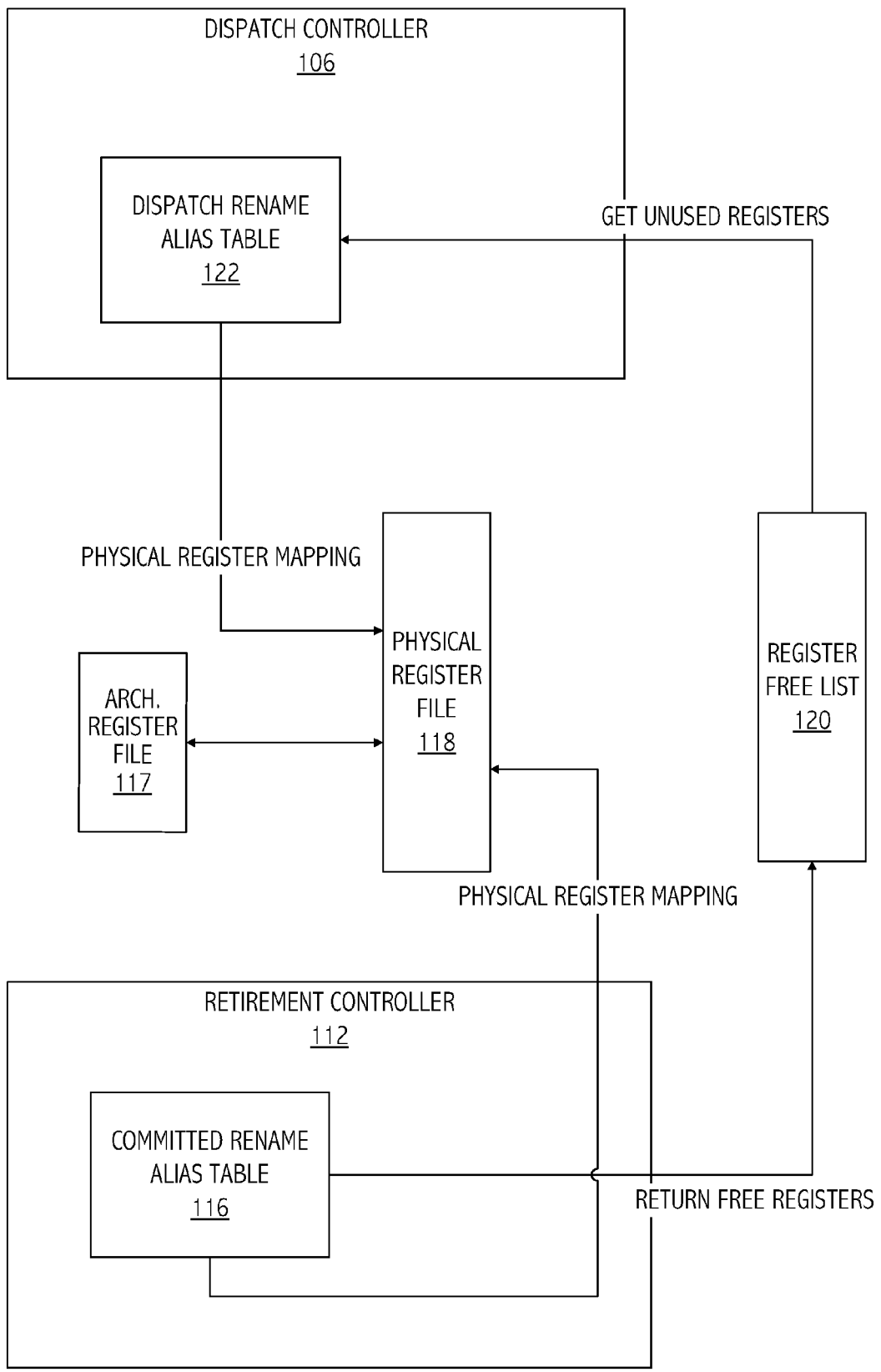
FIG. 2 illustrates a functional block diagram of an exemplary instruction dispatch controller and instruction retirement controller of the out-of-order execution processing system of FIG. 1.

Referring to FIG. 2, in at least one embodiment of processor 100, dispatch controller 106 maps architectural registers to unused physical registers of physical register file 118 in dispatch rename alias table 122. Dispatch controller 106 gets a next pointer corresponding to an unused register from register free list 120 and enters corresponding information in dispatch rename alias table 122. When an operation is validated, retirement controller 112 enters the mapping of the architectural register to the physical register in a committed rename data structure (e.g., committed rename alias table 116, which typically has one entry for each architectural register and is the same size as dispatch rename alias table 122). Note that dispatch rename alias table 122 and committed rename alias table 116 may have different entries as operations progress through processor 100. Retirement controller 112 retires the operation by writing results from the physical register file 118 to architectural register file 117 and reclaims free physical registers by writing their pointers in register free list 120. Retirement controller 112 may then overwrite the architectural register mapping in committed rename alias table 116 with new committed register mappings.

In at least one embodiment of processor 100, the out-of-order window space is controlled using tokens that indicate a number of physical registers available in register free list 120. Upon a cleanup event (e.g., a pipeflush due to a branch misprediction or an exception or another synchronizing operation), processor 100 resets a current token count to a predetermined maximum count (e.g., the number of physical registers available to instruction set-architectural registers) to give the free list a maximum size. Processor 100 copies contents of commit rename alias table 116 to dispatch rename alias table 122 during the cleanup event. Dispatch controller 106 decrements the token when dispatch controller 106 removes a physical register from register free list 120. Retirement controller 112 increments the token when retirement controller 112 returns a physical register to register free list 120. If no pointers to physical registers remain in register free list 120, then processor 100 stalls. Note that the token-controlled micro-architecture is exemplary only and teachings described herein are applicable to other embodiments of processor 100 that control register renaming using other techniques (e.g., direct stalling at the point of resource contention, ripple stalling backwards in the pipeline over several adjacent pipeline stages, or other suitable technique).

Figure 3:
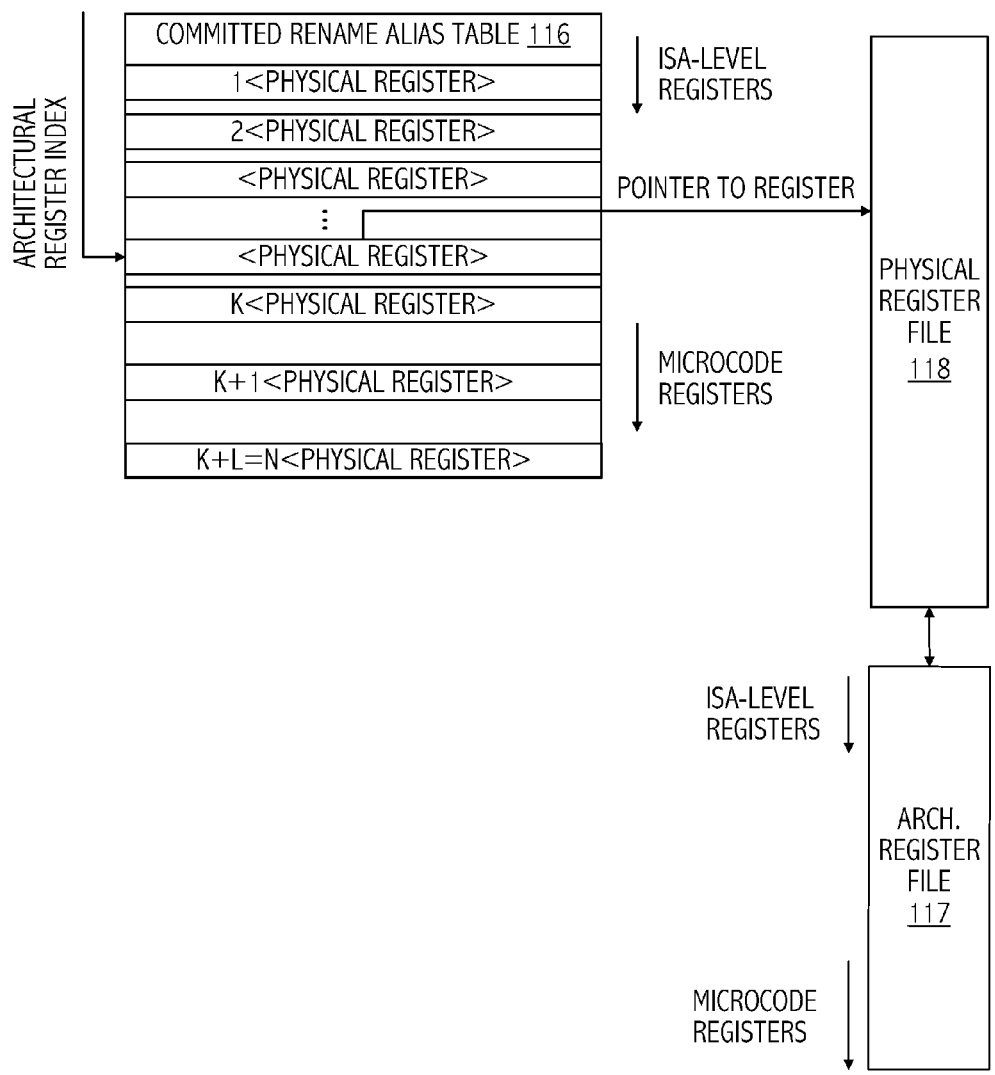
FIG. 3 illustrates a functional block diagram of an exemplary committed rename alias table of an out-of-order execution processing system.

Referring to FIG. 3, in at least one embodiment of processor 100, architectural register file 117 includes K instruction set architectural registers and L microcode architectural registers, both of which are mapped to physical register file 118. Accordingly, committed rename alias table 116 includes one entry for mapping each of the K instruction set architectural registers to physical registers and one entry for mapping each of the L microcode architectural registers to physical registers. In general, microcode (i.e., firmware) routines are machine-language routines used to reduce hardware complexity, e.g., microcode routines handle interrupts and exceptions and emulate complex instructions. Typical microcode architectural registers are permanently mapped to physical registers in physical register file 118. However, only a small portion of typical program execution is spent processing microcode routines. Typical microcode routines do not use all of the microcode architectural registers. In addition, typical microcode routines do not retain state information after exiting a particular microcode routine, i.e., the microcode architectural registers are not meaningful after exiting the particular microcode routine and need not be preserved across microcode routines. However, since a typical processor permanently maps microcode architectural registers to the physical register file, a typical program uses those physical registers mapped to microcode architectural registers only a small portion of program execution time. Those physical registers are available but are unused by regular program operations even though instruction set architectural registers are limited by the number of available physical registers.

In at least one embodiment, processor 100 improves utilization of physical register file 118 by allowing microcode architectural registers to be reclaimed for use by instruction set architectural registers. As referred to herein, reclaiming a microcode architectural register means adding to the free list an indicator of a physical register to which a microcode architectural register is mapped. For token-controlled embodiments, when processor 100 reclaims the microcode architectural register, processor 100 updates appropriate tokens accordingly. In at least one embodiment, processor 100 monitors an indicator or a condition of microcode architectural pointers to the physical register file (e.g., <PHYSICAL REGISTER>) and reclaims unused microcode architectural register pointers to the physical register file to thereby increase the number of physical registers available to the instruction set architectural registers. Such an indicator or condition may be referred to as a "liveness" indicator or "liveness" condition. By reclaiming the physical registers pointed to by microcode architectural registers and making them available for instruction set architectural registers, retirement control unit 112 may increase performance by providing a larger out-of-order window space or may reduce the physical size of processor 100 by increasing utilization of available physical registers and/or reducing a need for so many physical registers.

Figure 4:
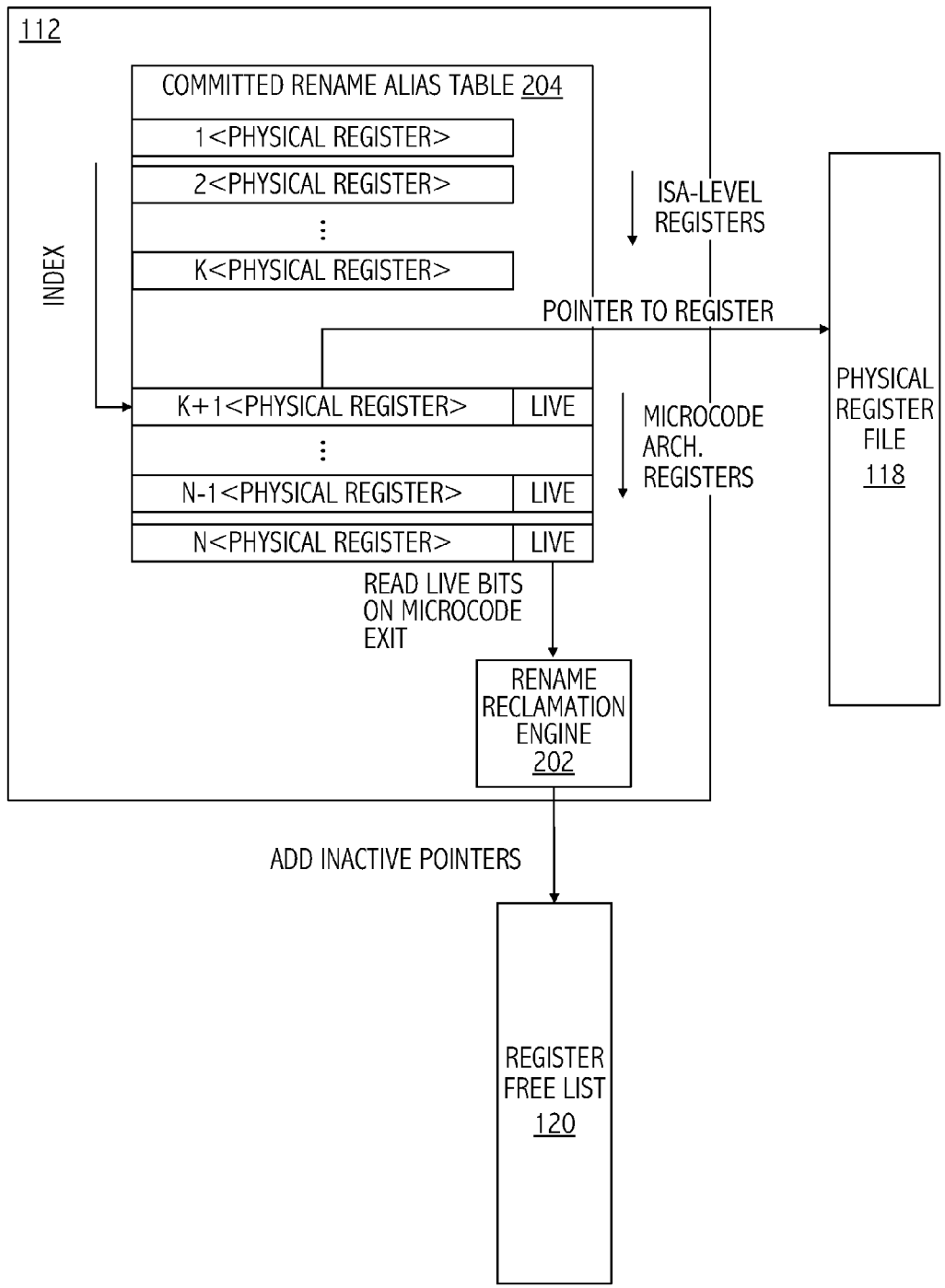
FIG. 4 illustrates a functional block diagram of a committed rename alias table of an out-of-order execution processing system consistent with at least one embodiment of the invention.

Referring to FIG. 4, in at least one embodiment of processor 100, retirement control unit 112 includes a committed rename data structure (e.g., committed rename alias table 204) that stores indicators of a liveness condition corresponding to the microcode architectural register pointers to the physical register file. For example, each entry of committed rename alias table 204 corresponding to a microcode architectural register includes a corresponding LIVE bit. Retirement controller 112 includes reclamation functionality, which in at least one embodiment of retirement controller 112 is included in rename reclamation engine 202. In at least one embodiment of processor 100, rename reclamation engine 202 is separate from retirement controller 112. In at least one embodiment, rename reclamation engine 202 monitors the microcode architectural registers, tracks the liveness condition of microcode architectural registers, and reclaims unused microcode architectural registers. In at least one embodiment of processor 100, the start of microcode instructions is signaled to rename reclamation engine 202 by the retirement of a microcode operation when a previous instruction retired was a non-microcode operation. Similarly, the end of a microcode routine is signaled to rename reclamation engine 202 (e.g., signaled by an exit signal associated with the final operation). In at least one embodiment of processor 100, more than one operation can be retired per cycle and one routine could end and another could start in the same cycle; thus, processor 100 provides a start/exit signal per operation retiring. Note that other techniques for signaling start and end of microcode instructions can be used (e.g., retirement reclamation engine 202 continues to operate until the first microcode operation that also wrote a microcode architectural register pointer actually retires).

In at least one embodiment, rename reclamation engine 202 initializes the liveness indicators (e.g., LIVE bits) of committed rename alias table 204 to indicate that no microcode architectural registers are live (i.e., all of the microcode architectural registers are inactive or dead) in response to an event (e.g., power-on-reset, reset, or other suitable event). When a microcode operation retires, rename reclamation engine 202 determines a liveness condition of one or more microcode architectural registers associated with the retiring operation. If rename reclamation engine 202 determines that the microcode architectural register is not live, as indicated by the corresponding LIVE bit, then the pointer associated with the microcode architectural register is garbage and nothing is pushed to register free list 120. Rename reclamation engine 202 writes the physical register file pointer into the committed rename alias table 204 and promotes the corresponding LIVE bit to indicate that the pointer is live (i.e., active). If rename reclamation engine 202 determines that the microcode architectural register is live, as indicated by the LIVE bit corresponding to the microcode architectural register associated with the retiring instruction, then rename reclamation engine 202 adds the pointer associated with the architectural register to register free list 120 and overwrites that pointer in committed rename alias table 204 associated with the microcode architectural register with a new rename pointer value and leaves the corresponding LIVE bit unchanged (i.e., the LIVE bit indicates that the pointer is live).

When the microcode routine ends (i.e., retirement controller 112 retires the last operation in the microcode routine), the microcode routine may have left zero, some, or all live microcode architectural registers with their LIVE bit set. Rename reclamation engine 202 detects the end of the microcode routine (e.g., receives a signal indicating the end of the routine) and reads each of the LIVE bits in committed rename alias table 204. Rename reclamation engine 202 updates register free list 120 (e.g., pushes pointers to register free list 120) with pointers associated with any microcode architectural registers that are live and changes the corresponding LIVE bit(s) from live to dead (i.e., inactive), e.g., by clearing the associated LIVE bit(s).

In at least one embodiment, rename reclamation engine 202 operates during unused retirement cycles, since the retirement pipeline is in control of buses and ports to physical register file 118 when overwriting committed rename alias table 204. In at least one embodiment, rename reclamation engine 202 operates during otherwise unused retirement cycles. For example, if a micro-architecture capable of retiring two operations per cycle only retires one operation in a particular cycle, rename reclamation engine 202 frees a microcode architectural register pointer using the other retirement lane (e.g., using ports, buses, and or paths to the register list and/or the free list). In at least one embodiment, committed rename alias table 204 and register free list 120 include additional write ports that allow rename reclamation engine 202 to free physical registers mapped to microcode architectural registers concurrently with physical registers mapped to retired instruction set architectural registers. For example, committed rename alias table 204 and register free list 120 may each include two ports used to retire instruction set architectural registers and another two ports used to retire microcoded architectural registers.

In at least one embodiment of processor 100 that includes a token-controlled micro-architecture, upon a cleanup event, processor 100 does not reset the current token count to a predetermined maximum count to give the free list a maximum size, as described above. Instead, the current token count is variable and depends on the number of microcode architectural register pointers that have a live status. In at least one embodiment of processor 100, the maximum count value is initialized to a predetermined maximum count because no microcode architectural register pointers are live and the maximum number of physical registers are in register free list 120. When a microcode operation writes a microcode architectural register pointer into committed rename alias table 204, and promotes a microcode architectural register pointer from dead to live, rename reclamation engine 202 decrements the maximum count value. When rename reclamation engine 202 is active and demotes a microcode architectural register pointer from live to dead, rename reclamation engine 202 increments the maximum count value. Accordingly, rename reclamation engine 202 maintains the maximum counter value at the difference between the total number of physical registers in physical register file 118 and the number of microcode architectural registers associated with live pointers in committed rename alias table 204.

In at least one embodiment of processor 100, while rename reclamation engine 202 executes (i.e., before rename reclamation engine 202 finishes reclaiming live microcode architectural register pointers to physical registers), if another microcode routine begins, then rename reclamation engine 202 pauses reclamation of microcode mapped physical registers and does not resume until the new microcode routine ends. Rename reclamation engine 202 leaves the liveness status of any already live microcode architectural register pointers as live and indicates any microcode architectural register pointers of newly retired operations as live. The already live microcode architectural register pointers will not be read because microcode routines do not share state information across routines.

Figure 5:
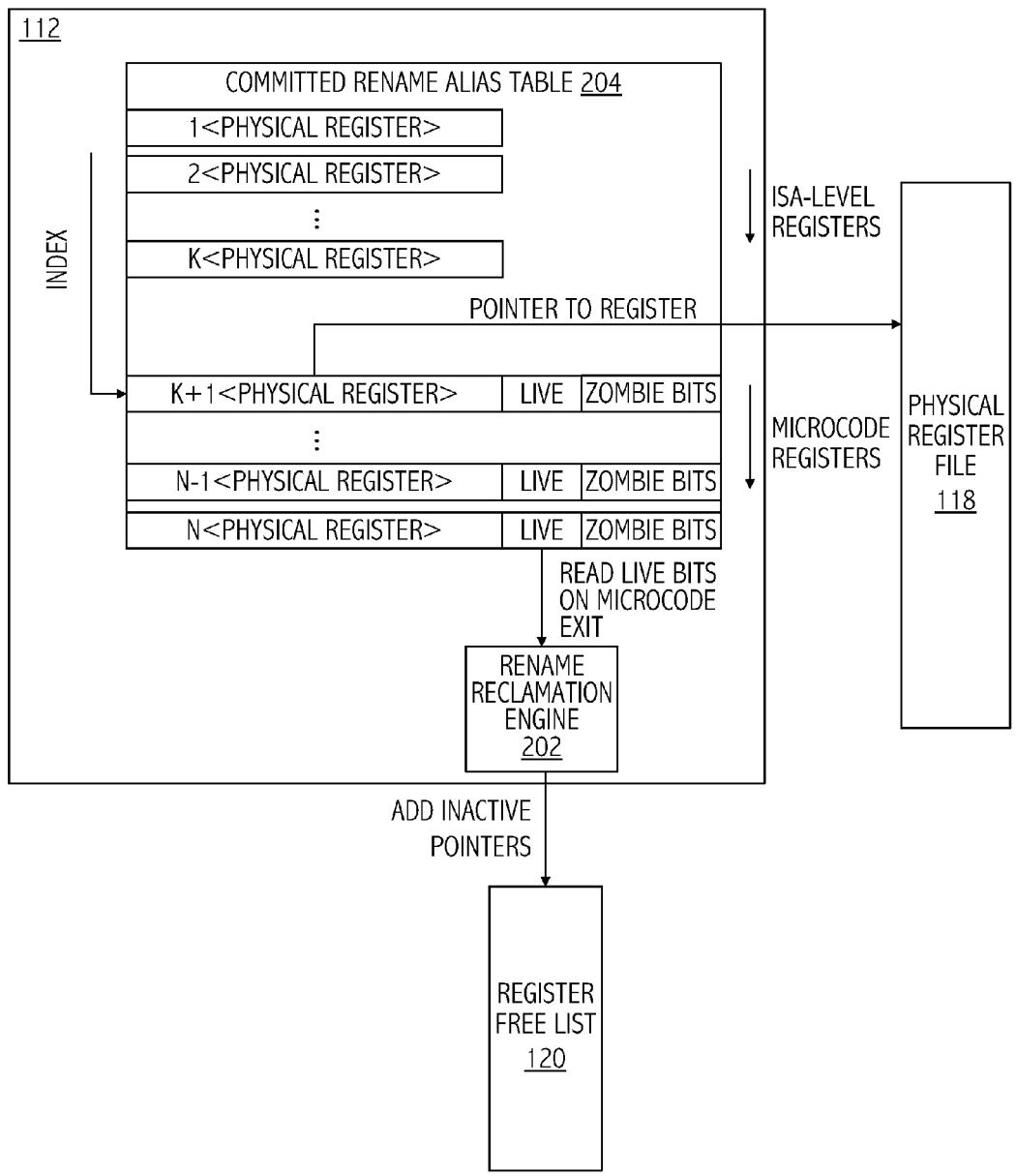
FIG. 5 illustrates a functional block diagram of a committed rename alias table of an out-of-order execution processing system consistent with at least one embodiment of the invention.

Referring to FIG. 5, in at least one embodiment, committed rename alias table 204 includes an additional indicator associated with architectural register pointers, e.g., a ZOMBIE bit for each microcode architectural register. The ZOMBIE bits facilitate more aggressive rename reclamation. In at least one embodiment, rename reclamation engine 202 initializes the ZOMBIE bits in response to an event (e.g., power-on-reset, reset, or other suitable event). Upon exiting a microcode routine, rename reclamation engine 202 logically ORs a current LIVE bit for a microcode architectural register with the corresponding ZOMBIE bit and the result is stored in the ZOMBIE bit and rename reclamation engine 202 clears the LIVE bit. Accordingly, rename reclamation engine 202 can reclaim physical registers when the microcode architectural register indicators indicate a ZOMBIE state and a dead state (e.g., ZOMBIE AND NOT(LIVE)) at any time, even during execution of microcode routines. The retirement mechanism reclaims a physical register to the free list in response to the ZOMBIE state or the LIVE state. In a token-based microarchitecture (as described above) rename reclamation engine 202 generates a signal to decrement the maximum counter value in response to a microcode architectural register being mapped to a physical register and an indication that the current state of the microcode architectural register being mapped is not in the ZOMBIE state and in a dead state (e.g., NOT ZOMBIE AND NOT LIVE).

In at least one embodiment, rename reclamation engine 202 recovers microcode architectural register pointers that are least likely to be reused next by microcode operations. For example, if a microcode architectural register (e.g., UCODE REG7) is almost never used as compared to other microcode architectural registers (e.g., UCODE REG0 and UCODE REG1), then if UCODE REG7 has a LIVE state, UCODE REG7 is reclaimed first. If rename reclamation engine 202 is paused by entrance into a new microcode routine, the new microcode routine is less likely to use UCODE REG7 live again as compared to UCODE REG0, and more physical registers remain available to the instruction set architectural registers. Thus, the maximum counter value and the number of physical registers available to the out-of-order operation window will be greater than reclamation that does not use a least-likely to be reused next policy.

In at least one embodiment of retirement controller 112, rather than include rename reclamation engine 202, processor 100 de-allocates (i.e., reclaims) microcode architectural register pointers before exiting the microcode routine in response to an explicit microcode instruction (e.g., UCDEALLOC). This technique requires the microcode routine to perform liveness state maintenance or to conservatively reclaim microcode architectural register pointers when the routine is unsure about whether a microcode architectural register pointer was previously used within the routine. Note that the explicit microcode deallocation instruction may be associated with costs, e.g., uses read-only memory space and increases power consumption. In at least one embodiment, retirement controller 112 uses a hybrid scheme whereby the microcode routine performs an early de-allocation of microcode architectural register pointers in unused microcode retirement cycles of lengthy microcode routines in response to a peak microcode architectural register pointer utilization. The hybrid retirement technique uses rename reclamation engine 202 to reclaim any microcode architectural register pointers that were not explicitly reclaimed.

Figure 6:
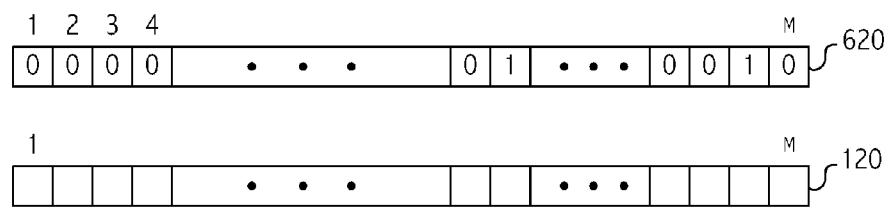
FIG. 6 illustrates a functional block diagram of a bit-vector free list of an out-of-order execution processing system consistent with at least one embodiment of the invention.

Referring to FIG. 6, in at least one embodiment of processor 100, register free list 120 is bit-mapped, e.g., register free list 120 includes M bits, one bit per physical register in physical register file 118. Each bit in register free list 120 indicates whether a corresponding physical register is currently available. In comparison, in other embodiments, register free list 120 includes a head pointer and a tail pointer to the register free list data structure and includes an entry count of M physical registers available to the architectural registers and each entry is sized $\log_2(M)$. In at least one embodiment, dispatch controller 106 dispatches up to two operations per cycle. Accordingly, dispatch controller 106 pulls two entries off of a bit-mapped register free list by performing a find-first search from both left and right sides of the bit-mapped register free list and encodes those values for use later in the pipeline. In at least one embodiment, processor 100 uses the decoded value with a mask function to clear the entries that have been selected. For example, in at least one embodiment, retirement controller 112 retires two operations per cycle. Accordingly, retirement controller 112 reclaims two entries back into a bit-mapped register free list by generating a vector (e.g., vector 620) including two active bits that indicate which two physical registers are being reclaimed. Then retirement controller 112 performs a logical OR of vector 620 with the contents of bit-vector free list 120. In at least one embodiment, the updated bit-vector free list (e.g., FLnext) is determined based on the current bit-vector free list (e.g., FL) and vectors based on the decoded dispatch rename alias table pointers (e.g., DISPATCH) and decoded committed rename alias table pointers (e.g., RETIRE). For example, FLnext= (FL AND NOT(DISPATCH)) OR RETIRE. In at least one embodiment, DISPATCH and RETIRE may be reordered since in a token-controlled micro-architecture, the DISPATCH and RETIRE vector positions do not coincide.

In at least one embodiment of processor 100 that includes bit-mapped register free list 120, reclaiming physical registers into the free list is performed using a bit-mask operation. Accordingly, all microcode architectural register pointers to the physical register file can be reclaimed concurrently by the bit-mask operation. In at least one embodiment of retirement controller 112, a decoder is included for each entry of committed rename alias table 204 corresponding to a microcode architectural register to decode the LIVE bits. A LIVEMASK (e.g., vector 620) is generated by performing an OR of the LIVEMASK with the decoder outputs. Then, a logical-OR of the LIVEMASK with free list 120 reclaims the live microcode architectural register pointers to bit-mapped register free list 120. In at least one embodiment of processor 100, fewer decoders may be used (e.g., a number of decoders greater than the retirement width, but less than the number needed to free all the microcode architectural register pointers concurrently) to identify fewer microcode architectural register pointers to be reclaimed concurrently, which achieves a higher reclamation rate than other reclamation controllers without incurring the cost of decoders for concurrent reclamation of all microcode architectural register pointers.

In at least one embodiment of processor 100, rather than generating the LIVEMASK on demand by decoding LIVE bits in committed rename alias table 204, retirement controller 112 maintains a current LIVEMASK (e.g., vector 620) using a number of flip-flops equal to the number of physical registers in the physical register file. When a microcode operation retires with a microcode architectural register pointer, the previously mapped physical register pointer is decoded and cleared in LIVEMASK 620. In at least one embodiment of processor 100, the decoder hardware for clearing the bit-mapped register free list at retirement is reused to decode and clear the destination in the bit-mapped register free list. The LIVEMASK bits are also set by the decoded bit(s) and a logical-OR of a new live microcode architectural register pointer destination. Accordingly, the LIVEMASK is the decoded logical-OR of all currently live microcode architectural register pointers in committed rename alias table 204. Therefore, when exiting the microcode routine (e.g., instruction retirement or exit retire), the LIVEMASK would already be usable as a mask to clear the bit-mapped register free list of any old microcode architectural register pointers that were no longer needed. This technique uses fewer decoders as compared to other techniques described above. For example, this technique uses a number of decoders that is twice the retirement width as compared to a number of decoders that is the retirement width plus the number of microcode architectural registers.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable media having encodings thereon (e.g., HDL, Verilog, GDSII data) of such circuits, systems, and methods, all as described herein, and as defined in the appended claims. In addition the computer readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in embodiments in which an out-of-order processor includes a particular micro-architecture, one of skill in the art will appreciate that the teachings herein can be utilized with other micro-architectures. Variations and modifications of the embodiments disclosed herein may be made based on the description set forth herein without departing from the scope and spirit of the invention as set forth in the following claims.

What is claimed is:

1. A method of operating a processor comprising:
   renaming, as a physical register, a microcode architectural register used by a microcode instruction, the renaming storing a pointer that identifies the physical register as containing state information for the microcode architectural register;
   committing the state information to the microcode architectural register and updating a value of an indicator corresponding to the microcode architectural register to indicate that the pointer is active; and
   reclaiming the physical register to be available for renaming an instruction set architectural register, the reclaiming being according to the indicator.

2. The method, as recited in claim 1, wherein reclaiming includes updating a register free data structure to include an indication that the physical register is available for renaming an instruction set architectural register.

3. The method, as recited in claim 1, further comprising:
   renaming an instruction set architectural register as the physical register.

4. The method, as recited in claim 1, wherein the reclaiming is responsive to retiring a microcode instruction indicating that a second pointer identifies a second physical register as containing state information for the microcode architectural register.

5. The method, as recited in claim 1, wherein the reclaiming adds the pointer to the register free data structure if the indicator indicates the pointer is active, and does not change the register free data structure otherwise.

6. The method, as recited in claim 1, further comprising:
   responsive to exiting the microcode routine, modifying the indicator to indicate that the pointer is inactive.

7. The method, as recited in claim 1, wherein the pointer is an index to a physical register file including the physical register.

8. The method, as recited in claim 1, wherein the indicator is a bit corresponding to the microcode architectural register and included in a committed rename alias data structure.

9. The method, as recited in claim 1, wherein the microcode instruction is included in a microcode routine that is one of a microcode routine emulating a complex instruction, a microcode routine handling an interrupt, and a microcode routine handling an exception.

10. The method, as recited in claim 1, further comprising:
    upon exiting the microcode routine, setting as active a second indicator corresponding to the microcode architectural register and resetting the indicator to an inactive state, the setting and resetting being in response to the second indicator being active or the indicator being active,
    wherein the reclaiming includes reclaiming the physical register in response to the corresponding second indicator being active and the indicator indicating an inactive status.

11. The method, as recited in claim 10, wherein the reclaiming reclaims one or more microcode architectural registers least-likely to be used next.

12. The method, as recited in claim 1, wherein the reclaiming includes concurrently reclaiming at least one additional physical register renamed as a corresponding at least one microcode architectural register used by the microcode routine.

13. The method, as recited in claim 12, wherein the at least one additional physical register includes all other physical registers in an associated physical register file.

14. The method, as recited in claim 1, wherein the reclaiming is in response to an explicit microcode deallocation instruction.

15. The method, as recited in claim 1, further comprising:
dispatching the microcode instruction to an execution controller, wherein the renaming comprises writing the pointer into a dispatch rename alias data structure having one entry corresponding to each architectural register, the architectural registers including instruction set architectural registers and microcode architectural registers; and
retiring the microcode instruction in response to completion of execution of an associated operation and verification of any speculation, the retiring including writing the pointer into a committed rename alias data structure having one entry corresponding to each architectural register.

16. The method, as recited in claim 1, wherein the physical register is one of a plurality of physical registers in a physical register file, wherein instruction set architectural registers and microcode architectural registers are renamed using the physical register file.

17. The method, as recited in claim 1, wherein the microcode architectural register is permanently mapped to a portion of the physical register file including the physical register.

18. An apparatus comprising:
a dispatch controller configured to rename, as a physical register, a microcode architectural register used by a microcode instruction, by storing a pointer that identifies the physical register as containing state information for the microcode architectural register; and
a retirement controller configured to commit the state information to the microcode architectural register and configured to update a value of an indicator corresponding to the microcode architectural register to indicate that the pointer is active, the retirement controller being further configured to reclaim the physical register to be available for renaming an instruction set architectural register, the reclaiming being according to the indicator.

19. A computer-readable medium storing instructions adapted to create a circuit operable to rename, as a physical register, a microcode architectural register used by a microcode instruction, by storing a pointer that identifies the physical register as containing state information for the microcode architectural register, the circuit being operable to commit the state information to the microcode architectural register, the circuit being operable to update a value of an indicator corresponding to the microcode architectural register to indicate that the pointer is active, and the circuit being further operable to reclaim the physical register to be available for renaming an instruction set architectural register according to the indicator.

* * * * *